(12) United States Patent
Inoue

(10) Patent No.: US 6,813,774 B2
(45) Date of Patent: Nov. 2, 2004

(54) PROGRAM GUIDE DISPLAY APPARATUS AND PROGRAM GUIDE DISPLAY METHOD

(75) Inventor: Tatsu Inoue, Tokyo-to (JP)

(73) Assignee: Pioneer Corporation, Tokyo-to (JP)

(*) Notice: Subject to any disclaimer, the term of this patent is extended or adjusted under 35 U.S.C. 154(b) by 0 days.

(21) Appl. No.: 10/308,124

(22) Filed: Dec. 3, 2002

(65) Prior Publication Data

US 2003/0106060 A1 Jun. 5, 2003

(30) Foreign Application Priority Data

Dec. 3, 2001 (JP) .................................... P2001-368375

(51) Int. Cl.⁷ .............................................. H04N 5/445
(52) U.S. Cl. .......................................... 725/39; 725/44
(58) Field of Search ............................. 725/39, 43, 44, 725/52, 53, 47, 50, 45, 46, 40

(56) References Cited

U.S. PATENT DOCUMENTS

| 5,592,551 | A |   | 1/1997  | Lett et al. |       |
|-----------|---|---|---------|-------------|-------|
| 5,781,246 | A | * | 7/1998  | Alten et al. ................... | 725/40 |
| 5,822,123 | A | * | 10/1998 | Davis et al. .................. | 725/43 |
| 6,005,565 | A | * | 12/1999 | Legall et al. ................ | 345/721 |
| 6,128,009 | A | * | 10/2000 | Ohkura et al. ................ | 725/46 |
| 6,246,442 | B1 | * | 6/2001  | Harada et al. .............. | 348/569 |
| 6,499,138 | B1 | * | 12/2002 | Swix et al. .................... | 725/38 |
| 2002/0073425 | A1 | * | 6/2002 | Arai et al. ...................... | 725/44 |

FOREIGN PATENT DOCUMENTS

| EP | 1 056 283 A1 | 11/2000 |
|----|--------------|---------|
| WO | WO 00/14954  | 3/2000  |
| WO | WO 00/40016  | 7/2000  |

* cited by examiner

*Primary Examiner*—Chris Grant
*Assistant Examiner*—James Sheleheda
(74) *Attorney, Agent, or Firm*—Sughrue Mion, PLLC

(57) ABSTRACT

A program guide display apparatus for displaying a table of programs, which is a two dimensional arrangement for displaying program cells assigned to respective programs along the time and channel axes, is provided: a broadcast program search device which searches for a program whose broadcast time includes the current time; an earliest end time storage device which stores an end time of a program which finishes earliest of all the searched program, as an earliest end time; an earliest end time determination device which determines whether the current time is the stored earliest end time, or later than the stored earliest end time; and a program cell display device which displays a program cell with the stored earliest end time as a top display time of the table of programs, if the current time is the stored earliest end time, or later than the stored earliest end time.

13 Claims, 16 Drawing Sheets

FIG. 7

| ch | 1 | 2 | 3 | 4 | ... | 98 | 99 | 100 |
|---|---|---|---|---|---|---|---|---|
| START TIME | 7:00 | 7:30 | 7:00 | 7:30 | ... | 7:30 | 7:00 | 7:30 |
| END TIME | 7:45 | 8:15 | 8:00 | 8:30 | ... | 8:15 | 8:00 | 8:30 |

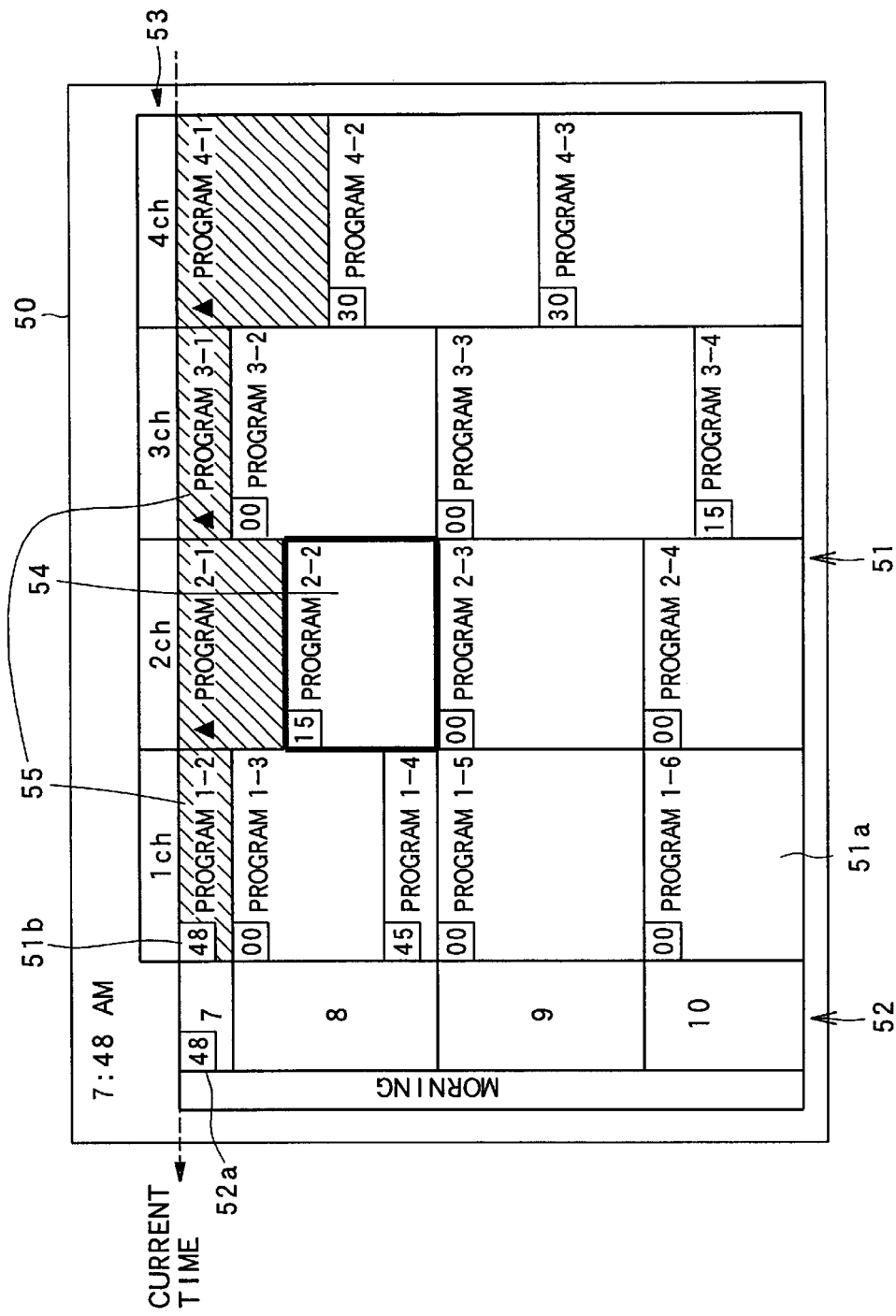

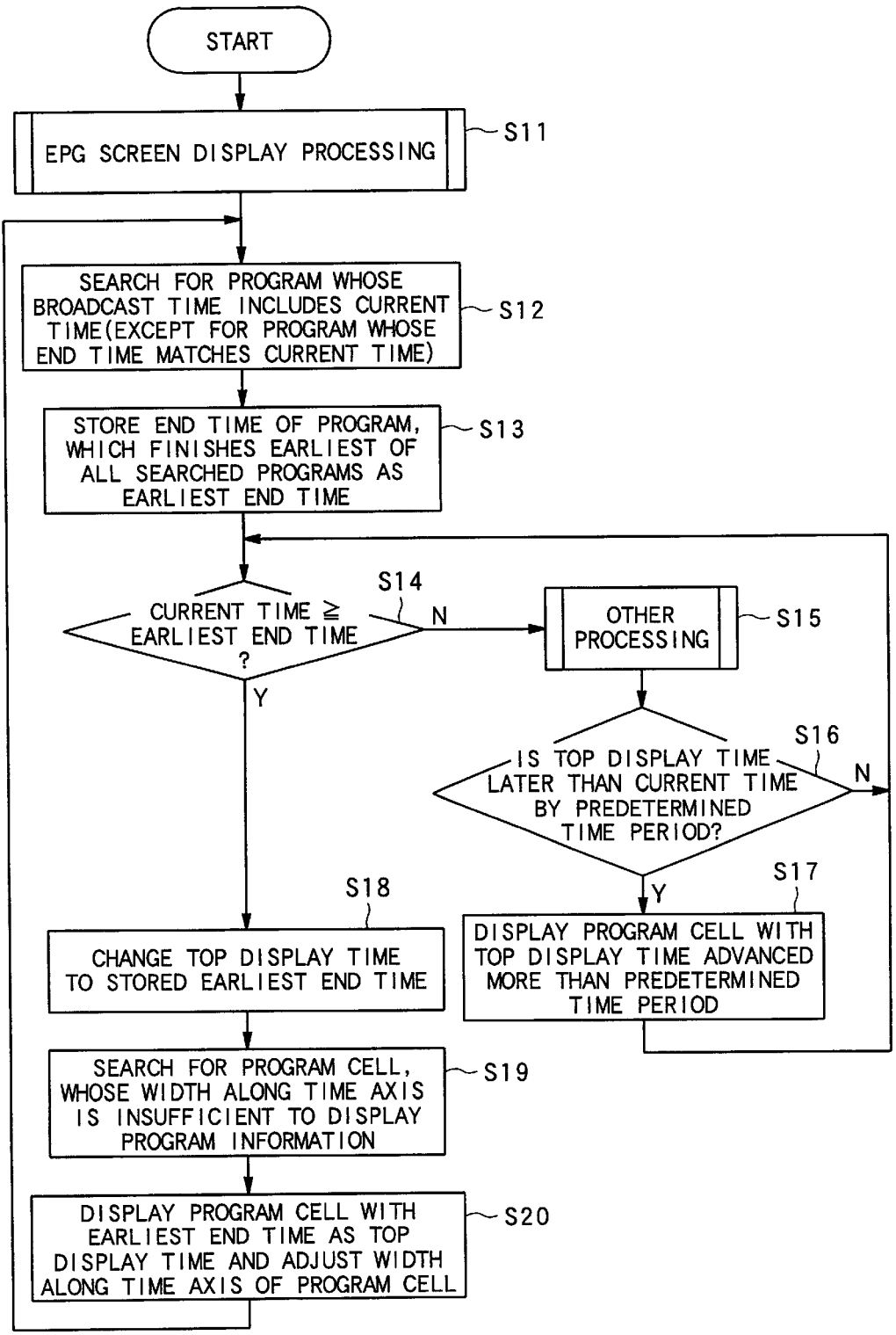

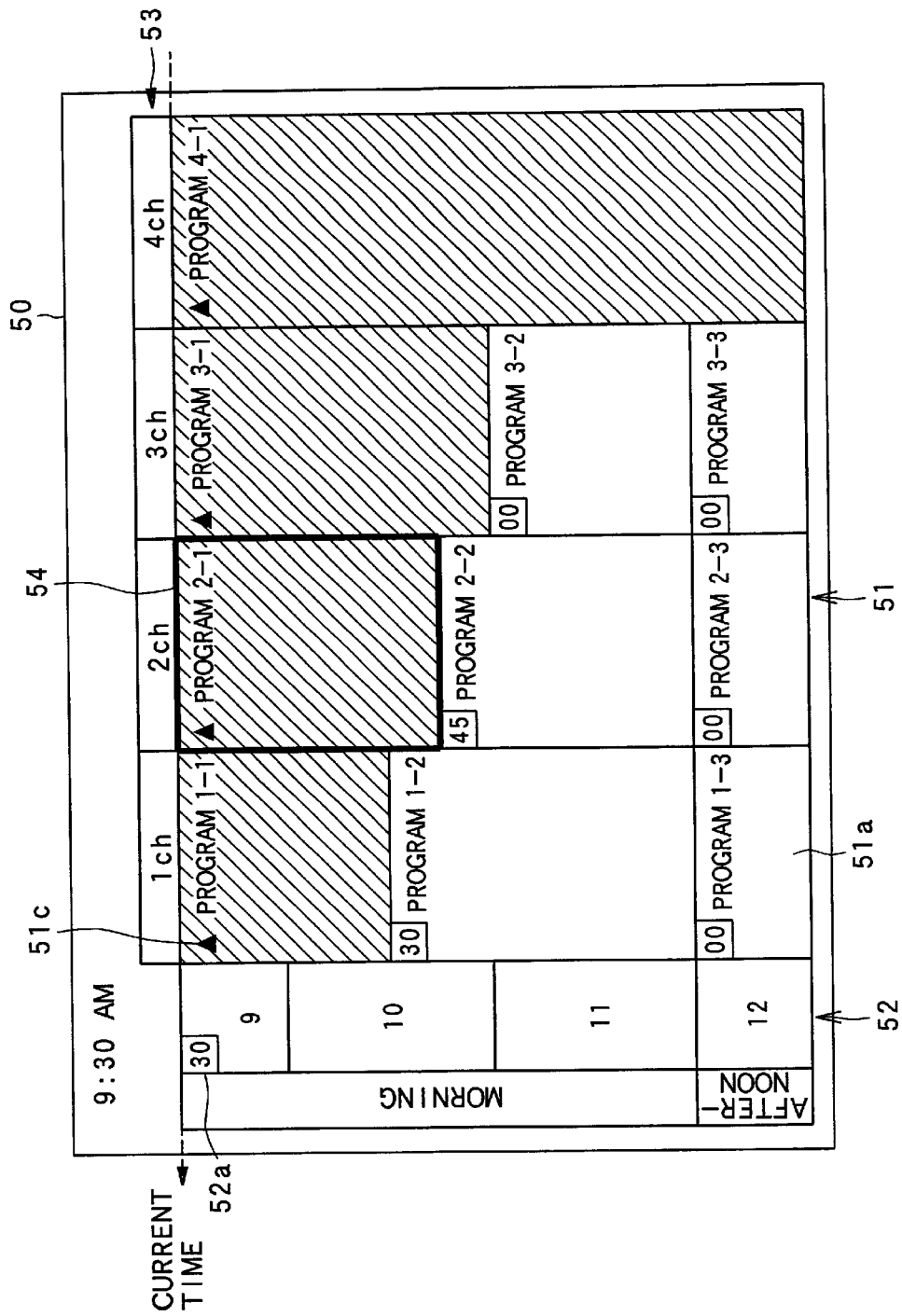

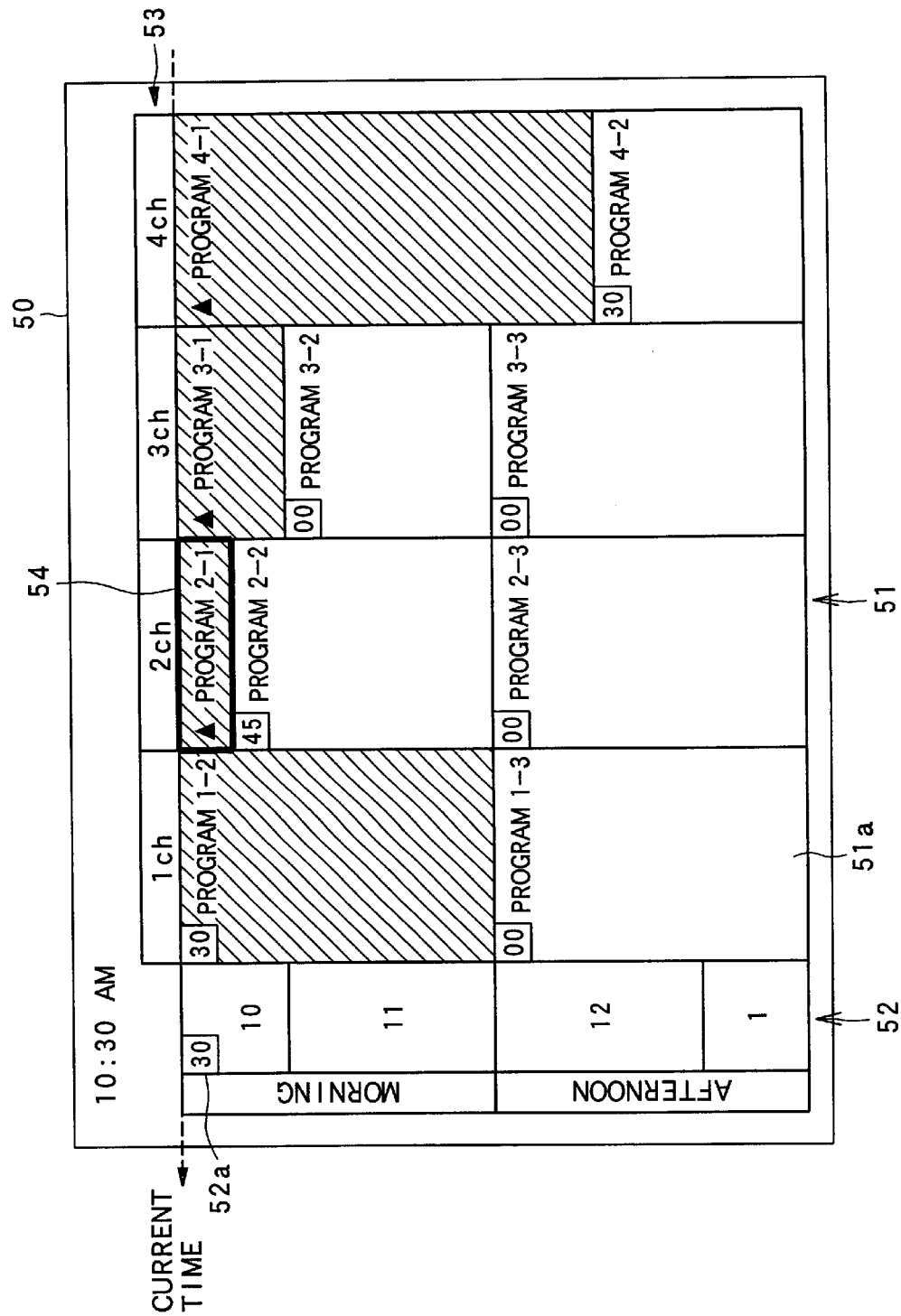

PROGRAM GUIDE DISPLAY APPARATUS AND PROGRAM GUIDE DISPLAY METHOD

BACKGROUND OF THE INVENTION

1. Field of the Invention

The present invention relates to an electronic program guide display apparatus and a method for displaying an Electronic Program Guide (EPG) on a TV display.

2. Description of the Related Art

Recently, digital-broadcasting systems have come into service, by which a digitized television signal is transmitted via a satellite such as a broadcast satellite or a communication satellite and a television program is viewed at each house by receiving the signal. Systems of this kind can broadcast a great number of programs due to the capacity for allocating many channels.

In systems of this kind, information about an EPG that represents contents of a number of programs is sent with picture and audio information on a program from a satellite to a receiver in each house. In each house, a user can display an EPG on a TV display and search for a program that the user wants to watch, by manipulating the receiver. A table of programs, which is a two-dimensional arrangement for displaying program cells assigned to respective programs along the time and channel axes, is displayed on the EPG screen, wherein the cell is shifted, for example, by one hour or half an hour along the time axis according to the current time (upward of a table of programs). In the program cell, program information such as a title and contents of a program is displayed.

FIG. 12 shows an example of a conventional EPG screen. In FIG. 12, a unit of display along the time axis is one hour, with a displayed time period ranging from 7:00 a.m. to 9:59 a.m. Assuming that the current time is 7:56 a.m., program cells for programs whose broadcast has finished ("program 1-1", "program 2-1", "program 3-1", "program 4-1") are also displayed as shown in FIG. 12. Under some broadcast standards, program information is no longer sent out when broadcast of the program has finished; thereby the cell for the program may be blanked out.

However, the fact that a program whose broadcast has finished takes up a large part of a limited display area of an EPG is troublesome with respect to user's viewability and usability.

To solve the problem, a method for displaying with a shorter unit of display, for example by one minute, along the time axis can be designed. FIG. 13 shows an example of an EPG screen with one minute of a unit of display along the time axis. The problem described above is eliminated in this case. However, as shown in FIG. 13, this screen has a drawback that program information cannot be displayed in a program cell when a width along the time axis of the program cell (i.e., height of the program cell) for a currently broadcast program is insufficient. It also has another drawback that a program cell is shifted (moved) by one minute, resulting in difficulty in viewing.

SUMMARY OF THE INVENTION

It is therefore an object of the present invention to provide a program guide display apparatus and a method capable of displaying a program guide with upgraded user viewability and usability.

The above object of the present invention can be achieved by a program guide display apparatus for displaying a table of programs, which is a two dimensional arrangement for displaying program cells assigned to respective programs along the time and channel axes, wherein said program cells are displayed with a start time of a program which is closest to the current time among all the programs whose broadcast time includes the current time, as a top display time of the table of programs.

According to the present invention, user's viewability and usability may be improved because a program cell for a program whose broadcast has finished is not displayed so that the program cell for the program no longer takes up a large part of a limited display area in a table of programs.

The above object of the present invention can be achieved by a program guide display apparatus for displaying a table of programs, which is a two dimensional arrangement for displaying program cells assigned to respective programs along the time and channel axes, provided with: a broadcast program search device which searches for a program whose broadcast time includes the current time; an earliest end time storage device which stores an end time of a program which finishes earliest of all the searched program, as an earliest end time; an earliest end time determination device which determines whether the current time is the stored earliest end time, or later than the stored earliest end time; and a program cell display device which displays a program cell with the stored earliest end time as a top display time of the table of programs, if the current time is the stored earliest end time, or later than the stored earliest end time.

According to the present invention, a program whose broadcast time period includes the current time is searched for (except for a program whose end time is the current time). Then, an end time of the program, which finishes earliest of all the searched programs, is stored as an earliest end time. Next, it is determined whether the current time is the stored earliest end time, or later than the stored earliest end time. If the current time is the stored earliest end time, or later than the stored earliest end time, the earliest end time will be displayed in the table of programs as a top display time. As a result, a program cell for a program whose broadcast has finished is not displayed in the table of programs, so that the program cell of the program no longer takes up a large part of a limited display area in the table of programs, thereby user's viewability and usability is improved.

In one aspect of the program guide display apparatus of the present invention, the program cell display device searches for a program cell, whose width along the time axis is insufficient to display program information, from program cells for programs, whose broadcast time includes the top display time, and adjusts the width along the time axis of the searched program cell, when the program cell display device displays the program cell with the earliest end time as the top display time of the table of programs.

According this aspect, even if a program cell, whose width along the time axis is insufficient to display program information, exists among program cells for programs, whose broadcast time periods include a top display time, the program information can be displayed by adjusting a width of the program cell along the time axis, thereby user's viewability and usability is further improved.

In another aspect of the program guide display apparatus of the present invention, the apparatus is further provided with a top display time determination device which determines whether the top display time is earlier than the current time by equal or more than a predetermined time period or not, the program cell display device displays the program cell with the top display time advanced by a predetermined time period, if the top display time is earlier than the current time by equal or more than a predetermined time period.

According this aspect, when a period between a top display time and an earliest end time is long, the top display time can be advanced properly, thereby user's viewability and usability is still further improved.

In further aspect of the program guide display apparatus of the present invention, the program cell display device displays the program cell with the current time as the top display time of the table of programs when the program cell display device displays the first one of the table of programs.

According this aspect, even in an initially displayed table of programs, a display of a program cell for a program whose broadcast has finished can be avoided.

In still further aspect of the program guide display apparatus of the present invention, the program cell display device searches for a program cell, whose width along the time axis is insufficient to display program information, from program cells for programs, whose broadcast time include the top display time, and adjusts the width along the time axis of the searched program cell when the program cell is displayed with the current time as the top display time of the table of programs.

According this aspect, even in an initially displayed table of programs, program information can be displayed in a program cell whose width along the time axis is insufficient to display program information, if such kind of program cell exists.

The above object of the present invention can be achieved by a program guide display method for displaying a table of programs, which is a two dimensional arrangement for displaying program cells assigned to respective programs along the time and channel axes, provided with: a process of searching for a program, whose broadcast time includes the current time; a process of storing an end time of a program that finishes earliest among the searched program, as an earliest end time; a process of determining whether the current time is the stored earliest end time, or later than the stored earliest end time; and, a process of displaying the program cell with the earliest end time as a top display time of the table of programs, if the current time is the stored earliest end time, or later than the stored earliest end time.

According to the present invention, a program cell for a program whose broadcast has finished is not displayed in the table of programs, so that the program cell of the program no longer takes up a large part of a limited display area in the table of programs, thereby user's viewability and usability is improved.

In one aspect of the program guide display method of the present invention, a program cell, whose width along the time axis is insufficient to display program information, from program cells for programs, whose broadcast time includes the top display time, is searched, and the width along the time axis of the searched program cell is adjusted, when the program cell is displayed with the earliest end time as the top display time of the table of programs.

In another aspect of the program guide display method of the present invention, the method is further provided with a process of determining whether the top display time is earlier than the current time by equal or more than a predetermined time period or not, the program cell is displayed with the top display time advanced by a predetermined time period, if the top display time is earlier than the current time by equal or more than a predetermined time period.

In further aspect of the program guide display method of the present invention, the program cell is displayed with the current time as the top display time of the table of programs, when the first one of the table of programs is displayed.

In still further aspect of the program guide display method of the present invention, a program cell, whose width along the time axis is insufficient to display program information, from program cells for programs, whose broadcast time includes the top display time, is searched, and the width along the time axis of the searched program cell is adjusted, when the program cell is displayed with the current time as the top display time of the table of programs.

BRIEF DESCRIPTION OF THE DRAWINGS

FIG. 7 shows start and end times for channels from channel 1 (1ch) to channel 100 (100ch) whose broadcast time includes a top display time 52a of a table of programs from information stored in a RAM 16;

FIG. 8B shows an example of an EPG screen, in which a width along the time axis of a program cell 51a has adjusted;

FIG. 9 is a flowchart showing EPG screen display processing by a CPU 17 in the second embodiment;

FIGS. 10A and 10B show an example of an EPG screen, which is displayed through display processing shown in FIG. 9;

FIG. 11 shows an example of an EPG screen, which is displayed through display processing shown in FIG. 9;

DETAILED DESCRIPTION OF THE PREFERRED EMBODIMENTS

Preferred embodiments of the invention will be described with reference to drawings. The description below is about the embodiments in which a program guide display device according to the invention is applied to a satellite digital broadcast receiver.

[1] Configuration of a Receiver

Figure 1:
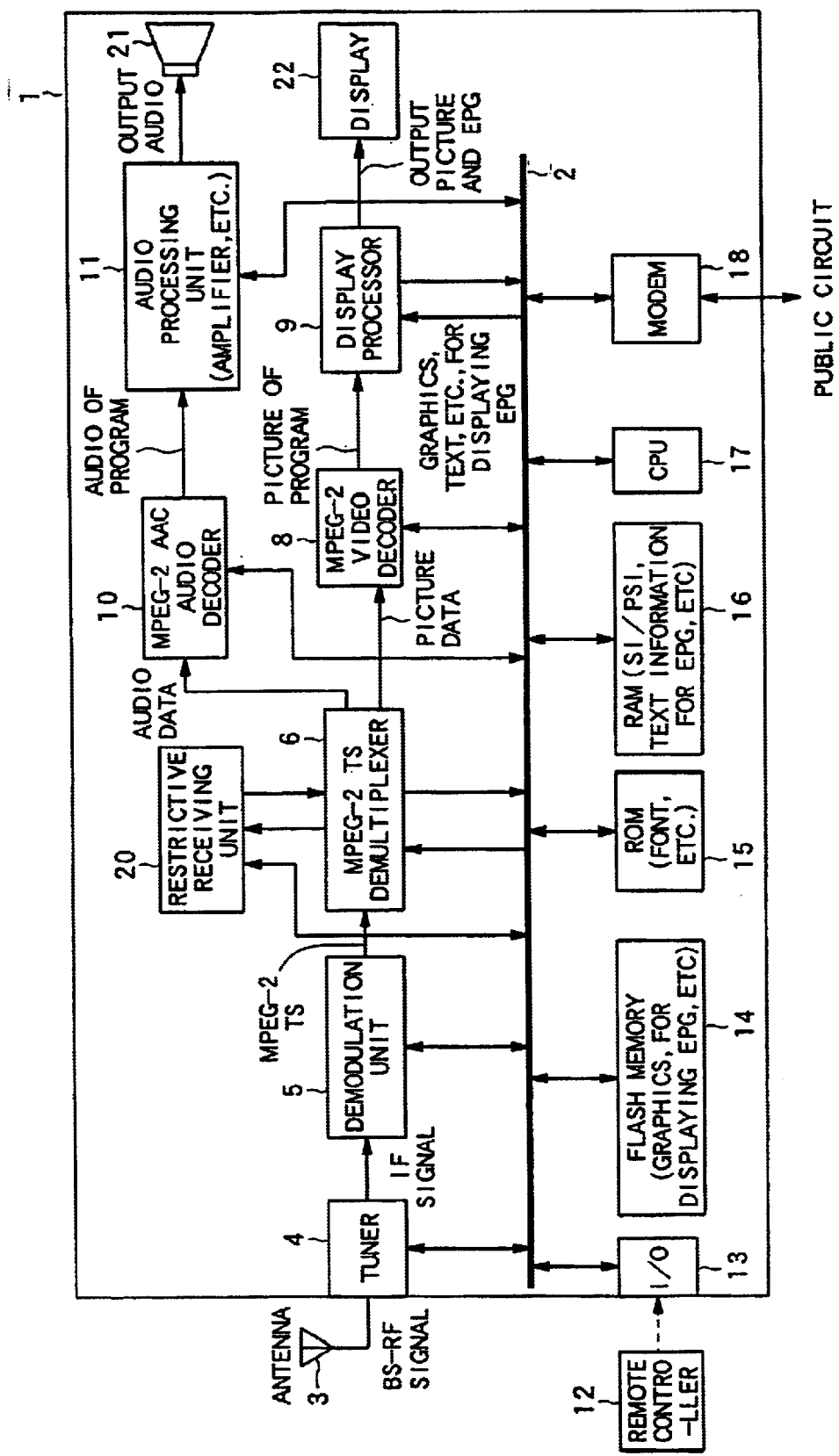
FIG. 1 shows a configuration of a satellite digital broadcast receiver according to the present invention.

FIG. 1 shows a configuration of a satellite digital broadcast receiver according to an embodiment of the present invention. The satellite digital broadcast receiver 1 shown in FIG. 1 is placed at a viewer's house, receives a digital broadcast signal (broadcast wave) from a satellite, and displays a television (TV) program on a display 22 of a receiver 1. The receiver also has a function of receiving information about electronic program guide (EPG) sent from a satellite with the digital broadcast signal and displaying the information on a display 22 in response to the viewer's instruction.

As shown in FIG. 1, a receiver 1 has a configuration that connects various elements to a bus 2. A receiver 1 may also be operated with an attached remote controller 12 as an operation device.

A broadcast wave sent from a satellite (BS-RF signal) is received by an antenna 3 and sent to a tuner 4 in a receiver 1. This broadcast wave includes information to be used for displaying an EPG (SI: Service Information; program arrangement information) as well as picture and audio information of television program (hereinafter referred to as "TV program information"). A tuner 4 tunes to a receive band, which is selected by a user, converts a received signal wave to an IF (intermediate frequency) signal, and sends the signal to a demodulation unit 5. The demodulation unit 5 demodulates an input digital signal, performs necessary processes such as reconfiguration of a data frame and an error correction, and supplies the data in the form of Transport Stream (TS) of MPEG2 to a demultiplexer 6.

A demultiplexer 6 extracts audio and picture data on specified service from the input TS of MPEG2 and supplies the data into an audio decoder 10 and a video decoder 8, respectively. Audio data is in the form of MPEG2-AAC while picture data is in the form of MPEG2-Video. The audio decoder 10 decodes the input audio data to generate program audio data and sends the generated data to an audio processing unit 11. The audio processing unit 11, which includes an amplifier, performs predetermined audio signal processing to generate an audio output signal, which is presented to a speaker 21.

On the other hand, the video decoder 8 decodes the picture data to generate program picture data and sends the generated data to a display processor 9. The display processor 9 performs a predetermined process to the input program picture data to generate a picture output signal. The display processor 9 also has a function of superimposing character information and the like on a program picture displayed on a display 22. Data for displaying an EPG and coordinate data described bellow is superimposed by this display processor 9 on the program picture data or replaced with program picture data, output to and displayed on a display 22.

The demultiplexer 6 also extracts control data including SI from an input TS of MPEG2. SI is information, which is the base for data for displaying an EPG and coordinate data. By using the SI, EPG display processing and area display processing are performed. Control data including SI, which is extracted by a demultiplexer 6, is stored in a RAM 16 as storing device under the control of a CPU 17. Therefore, a CPU 17 has a function as program information acquisition device for acquiring program information including at least a program title, a start time, duration of a program or an end time, a broadcast channel, and a broadcast date of a plurality of programs.

EPG text data for displaying an EPG is also stored in a RAM 16. Flash memory 14 stores various graphic data required to display an EPG (a frame for a table of programs, a predetermined mark such as logo mark of a broadcast channel), while a ROM15 stores font data, which is used as text data for an EPG.

A restrictive receiving unit 20 performs a process described below. A subscribed restricted broadcast is performed for each service or program, with a TS of MPEG2 to be encrypted and sent. A restrictive receiving unit 20 includes a decrypting unit (not shown) and an IC card that records subscription information to be used in view determination (not shown). This IC card is distributed from a service center jointly operated by broadcast providers to a user of each receiver. Subscription information for a user is written on this card according to a subscription between a user and each broadcast provider, and the written information usually differs among users. If a user selects a restrictive broadcast program, a restrictive receiving unit 20 uses both of subscription information for a user and information associated with decryption obtained from a broadcast wave to determine whether the user subscribes to the program or not. If the user is determined to subscribe to the program, the restrictive receiving unit 20 decrypts a TS of MPEG2 so that the user can view the program. If the user is determined not to subscribe to the program, the restrictive receiving unit 20 does not decrypt a TS of MPEG2 so that the user cannot view this restrictive broadcast program.

In the case of a Pay Per View program, purchase status is written on an IC card for each time a user purchases a program, and Pay Per View program purchase information is sent from a receiving side via a modem 18 and a public circuit (network) to broadcast distributors at regular intervals.

An instruction input by a user with a remote controller 12 is sent to a CPU 17 via an interface 13 to be recognized. A CPU 17 controls each element within a receiver 1 according to the user's instruction. For example, a CPU 17 controls sending of an instruction for tuning to a frequency of the channel specified by the user to a tuner 4. A CPU 17 also has a function to display an EPG screen on a display 22 as well as functions a program cell display device, a broadcast program search device, an earliest end time storage device, an earliest end time determination device, a top display time determination device according to the present invention.

A bus 2 is connected via a modem 18 to a public circuit (network), thereby a connection to a telephone or a personal computer in a viewer's house is established, and a required communication between a broadcast station and a viewer's house is performed.

[2] Signal Format

Figure 2:
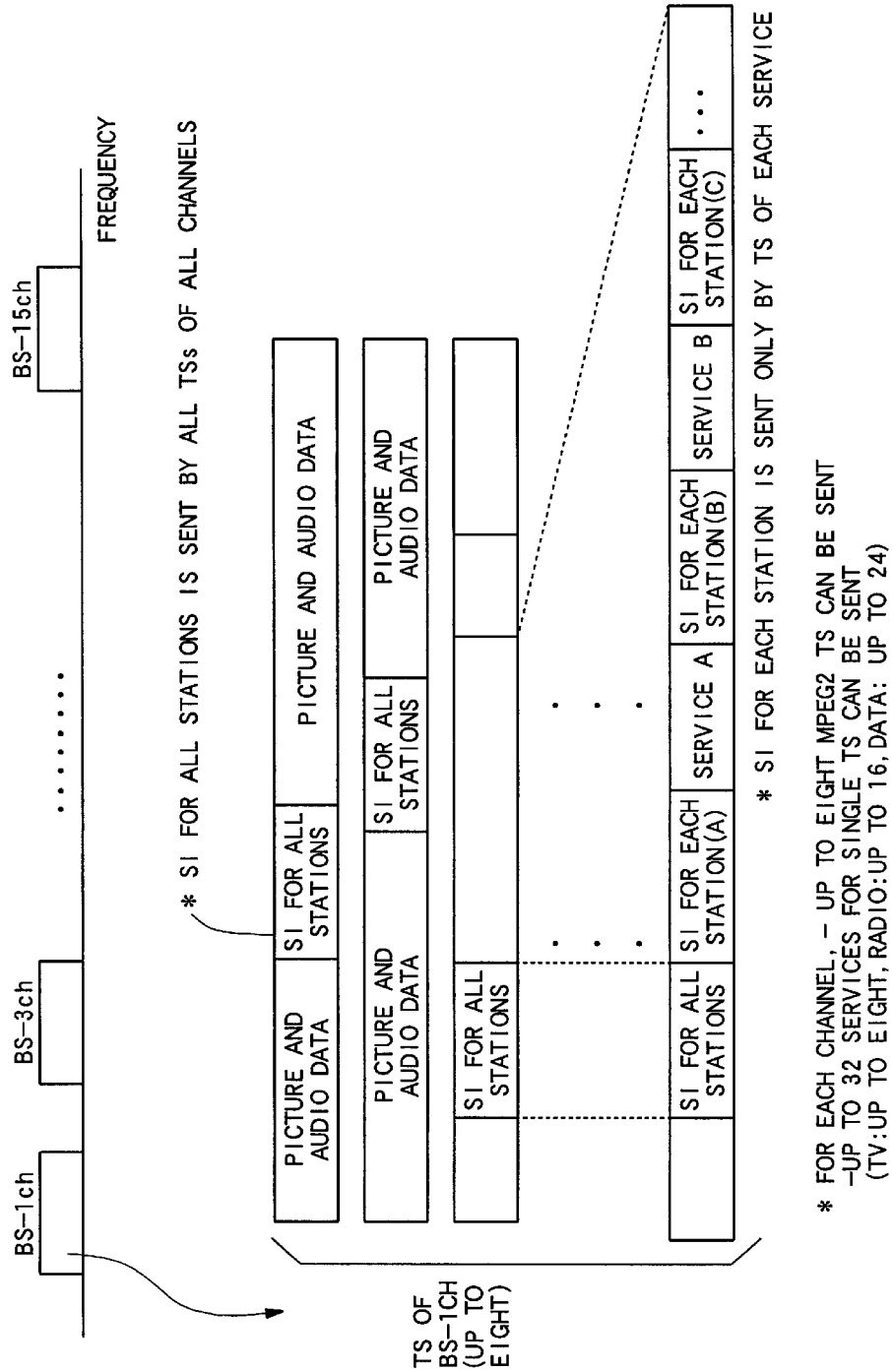
FIG. 2 outlines data format of a digital signal, which is sent from a satellite as base data for the EPG display data.

FIG. 2 outlines data format of a digital signal, which is sent from a satellite as base data for the data for displaying an EPG. As shown in FIG. 2, in a satellite digital broadcasting system, a plurality of BS channels (band) are set, which allows up to eight TSs of MPEG2 to be sent for each BS channel. Additionally, up to 32 services can be sent for each TS. In the description below, a frequency band for satellite broadcasting is called "BS channel" to distinguish from a channel of each broadcast program that is received by a receiver 1.

Within each TS, SI for all stations is multiplexed in such information as picture or audio information. SI for all stations refers to SI for all of the broadcast station that includes program arrangement information for all channels. In other words, SI for all stations with the same contents is multiplexed and sent in all TSs of all BS channels. Accordingly, a viewer can generate EPG data for all channels by acquiring SI for all stations, which is included in a TS of the channel, whichever channel of whichever broadcast station is being received by the user. Particularly, a CPU 17 shown in FIG. 1 acquires SI for all stations from a currently received TS by controlling a demultiplexer 6 and generates EPG text data on the basis of the SI.

Formats of picture and audio data in each TS is shown at the bottom of FIG. 2. It has been described that up to 32 services can be sent for a single TS. The multiple services are time-division multiplexed in the form of a packet in a single TS. In the example of FIG. 2, services from a plurality of broadcast stations (Service A, B, . . . ) are time-division multiplexed in the lowest TS. Therefore, a CPU 17 initially tunes a tuner 4 in FIG. 1 to a BS channel, which includes the TS, for example to receive Service A. Then, a demodulation unit 5 in FIG. 1 identifies and extracts the TS to be processed from a plurality of TSs contained in the BS channel. Service A, which is time-division multiplexed in the TS, should be further extracted by referring to the identification information by the demultiplexer 6.

As shown in FIG. 2, at the top of data as to each service station (shown as Service A, B . . . ), SI for each station about the service in question is inserted. SI for each station is the information same as SI for all stations, except for including unique information about each station which is not included in SI for all stations. In other words, SI for all stations includes necessary information for displaying a table of programs as an EPG for all channels, while SI for each station includes information further in detail such as a summary of each program. Thus, a CPU 17 in FIG. 1 can display brief information about a certain channel by acquiring SI for each station on the basis of a user's instruction.

[3] Appearance of an EPG Screen

Figure 3:
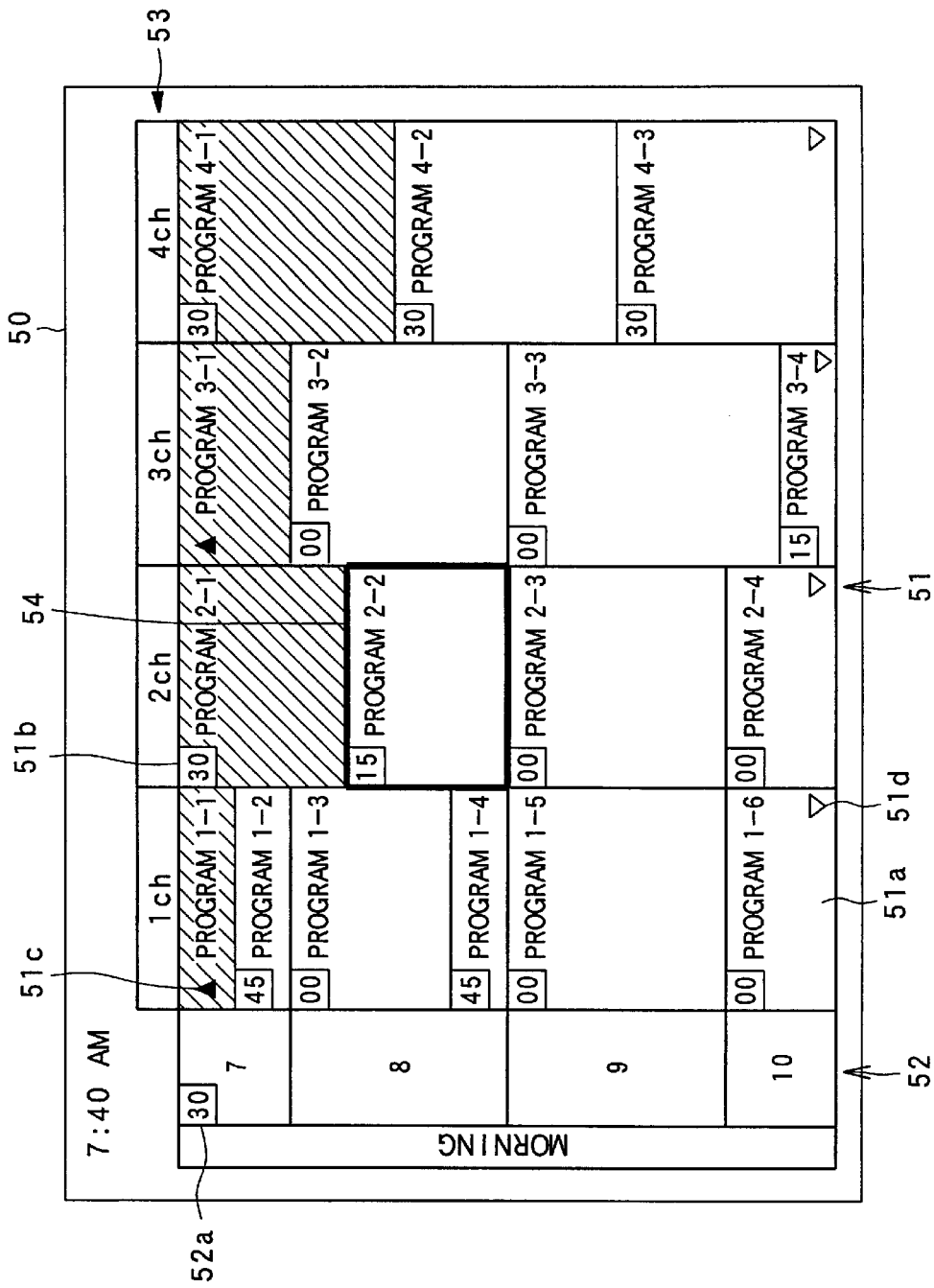
FIG. 3 shows an example of an EPG screen according to the present invention.

FIG. 3 shows an exemplary EPG screen of the embodiment. As shown in FIG. 3, an EPG screen 50 is provided with a table of programs display area 51, a time period display area 52, and a channel display area 53. The current time is also displayed at the upper left part of an EPG screen 50.

In a table of programs display area 51, a table of programs, in which program cells 51a assigned to respective programs (framed against each other) are arranged in two-dimension along the time axis (in FIG. 3, axis of ordinates) and the channel axis (in FIG. 3, axis of abscissas). In each program cell 51a, program information such as a title of a program and contents of a program is displayed (in FIG. 3, the information is simplified to facilitate description). A start time of the program 51b is displayed at the upper left part of a program cell 51a. For a program cell 51a whose program is broadcast across a top display time of the table of programs, a continuation mark 51c is displayed to indicate that the program starts before the top display time of the table of programs. Hatched program cells among program cells 51a refer to currently broadcast programs. A continuation mark 51d shown in the lowest program cell 51a in the table of programs indicates that the program of the program cell 51a keeps broadcasting over the display range of the table of programs, i.e. over 10:30 in this example. Because the continuation mark 51d is not directly involved with the present invention, the mark 51d will be omitted from the drawings to the description below.

A time period display area 52 is provided along the time axis. In FIG. 3, time periods from 7:30 to 10:29 are displayed in this area 52. At the top of a time period display area 52, a top display time 52a of the table of programs is displayed. The top display time 52a is appropriately changed by processing of a CPU 17.

A channel display area 53 is provided along the channel axis. In FIG. 3, channels from channel 1 (1ch) to channel 4 (4ch) are displayed in this area 53.

The program cell 51a, on which a cursor 54 is placed (in FIG. 3, the cell is bordered with thick black), indicates the program currently selected by the user. The cursor 54 can be moved vertically and horizontally through the manipulation of a remote controller 12. By moving the cursor 54, which is placed on the leftmost program cell 51a, further to the left, program cells for programs after channel 5 (5ch) are displayed. By further moving downward the cursor 54, which is placed on the lowest program cell 51a, program cells for programs later than 10:30 are displayed.

While a table of programs for three hours along the time axis and four channels along the channel axis is displayed in a screen in FIG. 3, a table of programs is not limited to this form and can be arranged to display, for example, program cells for longer time or for more channels at a time.

[4] Operation of a Remote Controller

Figure 4:
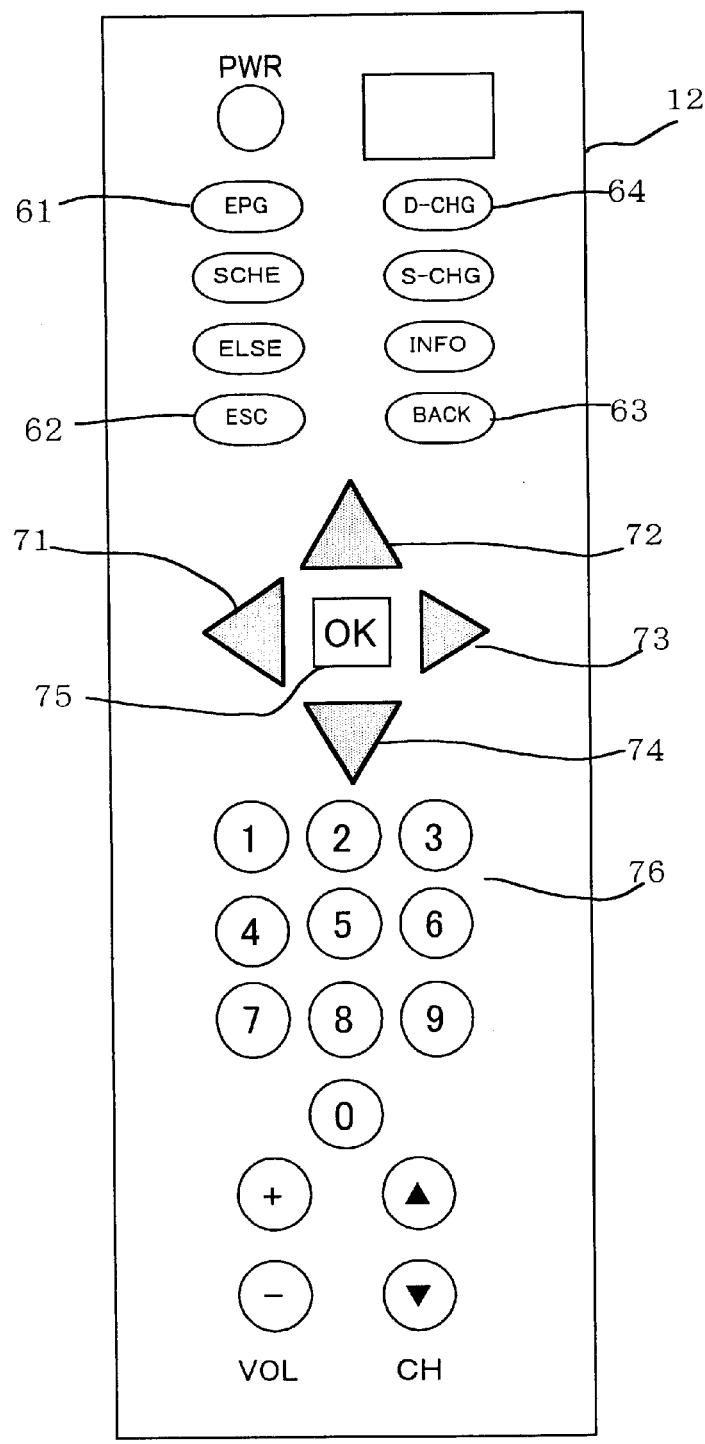
FIG. 4 shows various operation-keys arranged on a remote controller 12, which is used with a receiver 1.

FIG. 4 shows various operation-keys arranged on a remote controller 12 that is used with a receiver 1. Among function keys provided on the surface of a remote controller 12, an EPG key 61 is a key for displaying an EPG screen 50 as shown in FIG. 4. In other words, by pressing an EPG key 61 while viewing a program as usual, a program screen switches to an EPG screen 50 in a display 22. An EPG screen 50 may superimpose on a program screen. By pressing an EPG key 61 while an EPG screen 50 is displayed, the EPG screen switches back to the original program screen. An ESC key 62 is also used to switch an EPG screen back to a program screen. A BACK key 63 is used to return to a state before a preceding instruction was input by canceling the instruction. A Day Shift key 64 is used to display an EPG for another day instead of a currently displayed EPG.

Cursor shift keys 71–74 are arranged in a central area on a remote controller 12 and used to move a cursor 54 on an EPG screen 50. For example, pressing a leftward key 71 moves a cursor 54 to the next program cell 51a on the left and pressing a rightward key 73 moves a cursor 54 to the next program cell 51a on the right, while an EPG screen 50 shown in FIG. 3 is displayed. Also, pressing an upward key 72 moves a cursor 54 upward and pressing an downward key 74 moves a cursor 54 downward.

Moving a cursor 54 to a program to be selected by manipulating cursor shift keys 71–74 does not allow the program selection to be confirmed in processing of a receiver 1. Pressing a confirmation key 75 after a cursor 54 is moved on a program allows the program selection to be confirmed. Then, the receiver 1 switches to a channel of the selected program and starts receiving so that the picture of the program is displayed on a display 22.

Ten keys 76 of 1-0 are placed as function keys below cursor shift keys 71–74 and a confirmation key 75, which are used to input a channel to be received.

Although other keys such as a genre key to be used to display an EPG for each genre are also provided on a remote controller 12, descriptions of them are omitted because those keys are not directly involved with the present invention.

[5] Display Processing of an EPG Screen

Display processing of an EPG screen performed by a CPU 17 with the above-mentioned configuration of the receiver 1 will be described for a first embodiment and a second embodiment, respectively.

(First Embodiment)

Figure 5:
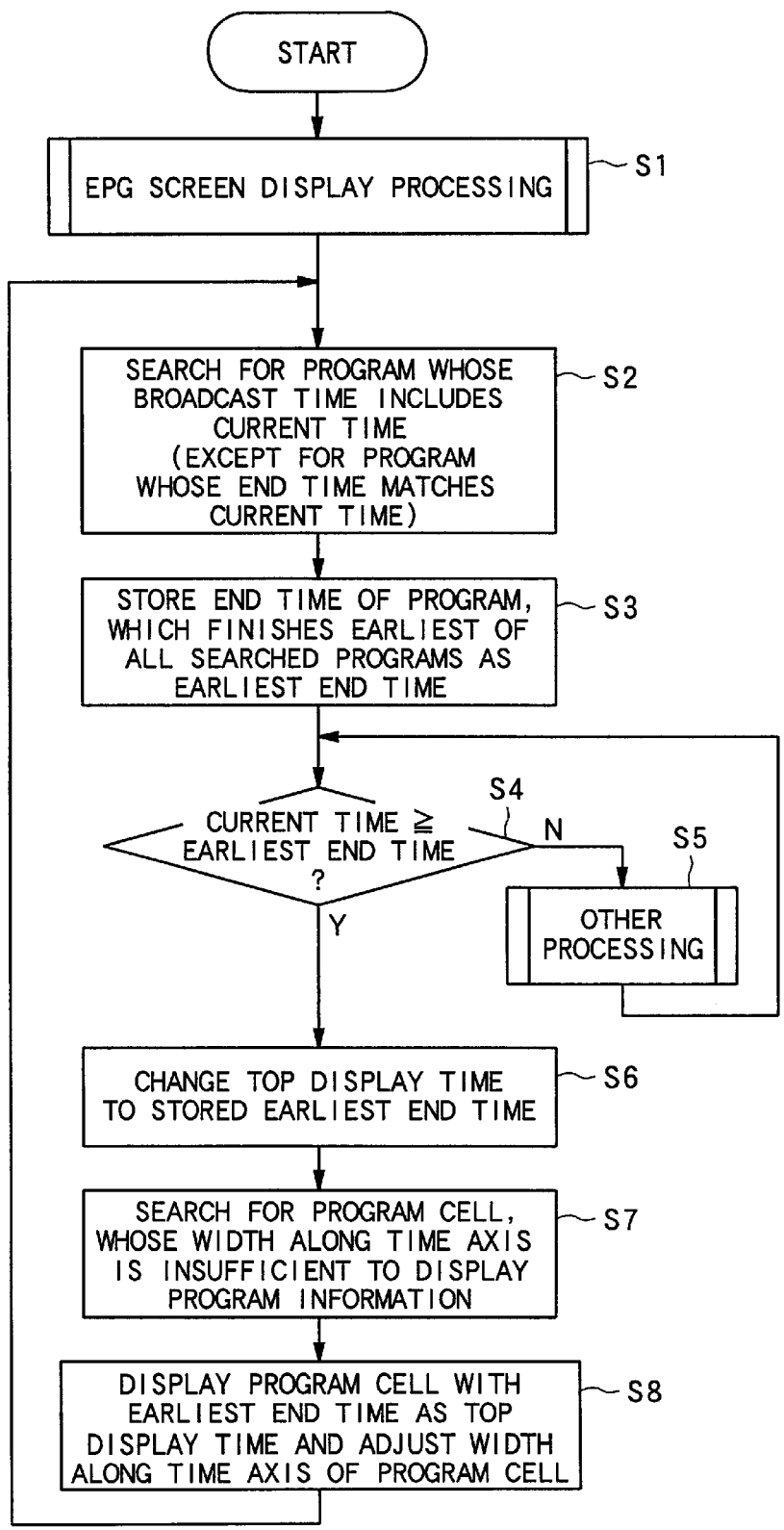
FIG. 5 is a flow chart showing display processing of an EPG screen by a CPU 17 in the first embodiment.
Figure 6A:
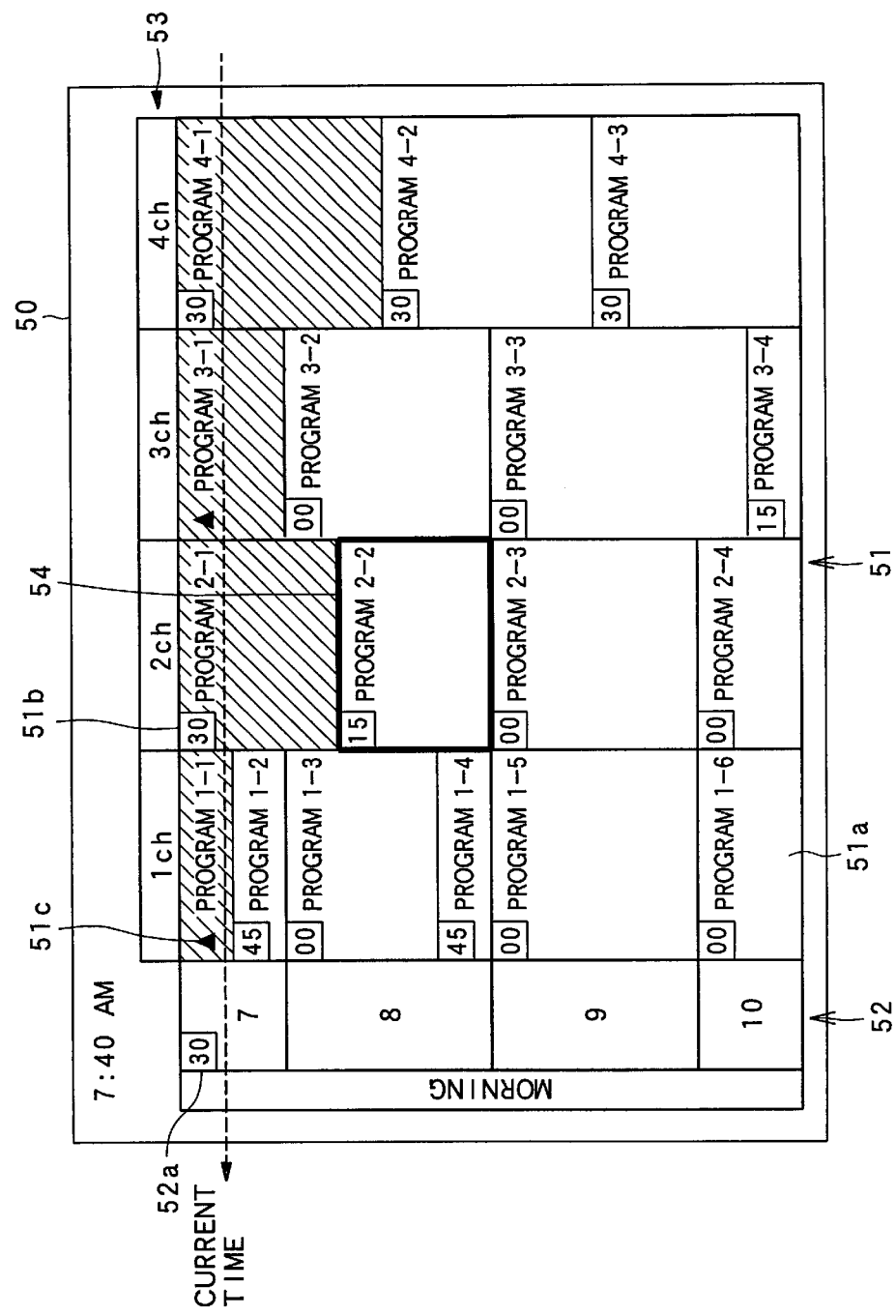
FIGS. 6A and 6B show an exemplary EPG screen displayed through the display processing shown in FIG. 5.
Figure 6B:
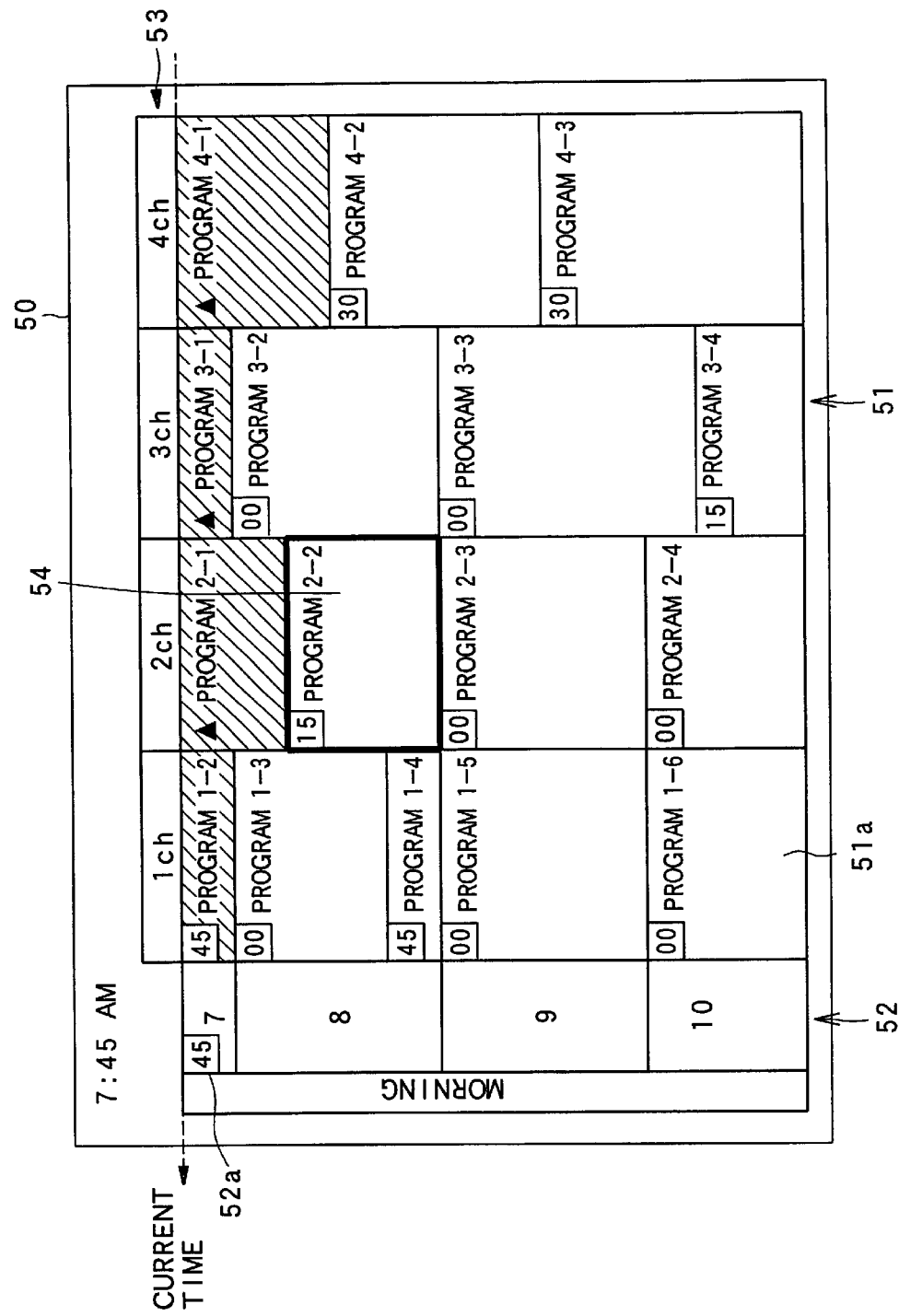

FIG. 5 is a flow chart showing display processing of an EPG screen by a CPU 17 in the first embodiment. FIG. 6 shows an exemplary EPG screen that is displayed through the display processing shown in FIG. 5.

A CPU 17 shown in FIG. 1 performs processes described below by referring to data stored in a RAM 16, executing a program stored in a ROM 15, and controlling each element such as a display processor 9.

Assume that a user is viewing a program. A CPU 17 determines whether an EPG key 61 on a remote controller 12 is pressed or not. If the key is determined to be pressed, the CPU 17 performs EPG screen display processing (step S1). In the EPG screen display processing, the CPU 17 generates EPG text data on the basis of SI stored on a RAM 16. Then, the CPU 17 generates data for displaying an EPG by using graphic data such as frame data for a table of programs stored in a flash memory 14, font data in a ROM 15, EPG text data in a RAM 16 and each piece of coordinate data on a table of programs.

When a CPU 17 generates data for displaying an EPG, the CPU 17 sets a top display time according to the current time. For example, if the current time is 7:40, a top display time is set to a just time earlier than the current time such as 7:00 or 7:30. Then, the CPU 17 supplies data for displaying an EPG to a display processor 9. The display processor 9 switches between program picture data from a video decoder 8 and data for displaying an EPG according to a switch instruction from a CPU 17, or superimposes data for displaying an EPG and the above-mentioned piece of coordinate data on program data, and outputs the data as a picture signal to a display 22. In this manner, an EPG screen 50 will be displayed as shown in FIG. 6A. In FIG. 6A, a top display time 52a of a table of programs is set to 7:30.

Next, a CPU 17 acts as a broadcast program search device and searches for a program whose broadcast time includes the current time by referring to a RAM 16 (step S2). A program whose end time is the current time is excluded from those programs to be searched. Programs to be searched are not limited to the programs of the currently displayed channel on the EPG 50. For example, assuming that channels are channel 1 (1ch)—channel 100 (100ch), programs to be searched include not only the programs of channel 1 (1ch)—channel 4 (4ch) that are displayed on an EPG screen 50 (shaded program cells 51a) shown in FIG. 6A, but also those programs of channel 5 (5ch)—channel 100 (100ch).

Next, the CPU 17 acts as an earliest end time storage device and stores the end time of a program that finishes earliest of all programs which are searched by referring to a RAM 16 as an earliest end time in a RAM 16 (step S3). FIG. 7 shows a program start time and a program end time for channel 1 (1ch)—channel 100 (100ch) whose broadcast times include a top display time 52a of a table of programs. In FIG. 7, an end time (7:45) of a program of a channel 1 (1ch) is illustrated as the earliest. Accordingly, the CPU 17 will store an end time of a program of channel 1 (1ch) as the earliest end time in a predetermined area of a RAM 16.

Next, the CPU 17 acts as an earliest end time determination device and determines whether the current time is the stored earliest end time, or later than the stored earliest end time (step S4). If the current time is not the stored earliest end time, or later than the stored earliest end time (step S4:N), the procedure continues to processing of step S5.

In processing of step S5, processes according to manipulation keys on a remote controller 12 is performed. For example, a CPU 17 moves a cursor 54 depending on the pressing of cursor shift keys 71–74, or switches displayed contents of the time axis or the channel axis according to the movement of cursor shift keys 54.

If the current time is the stored earliest end time, or later than the stored earliest end time (step S4:Y), the CPU 17 acts as a program cell display device, changes and sets a top display time 52a to a stored earliest end time (step S6), and, after processing of step S7, displays a program cell 51a with the earliest end time as a top display time 52a (step S8).

In processing of step S7, a CPU 17 searches for a program cell 51a, whose width along the time axis is insufficient to display program information, from program cells 51a whose broadcast time includes a top display time 52a. Programs to be searched are not limited to those programs of channels currently displayed on an EPG screen 50 as in the case of step S2.

Figure 8A:
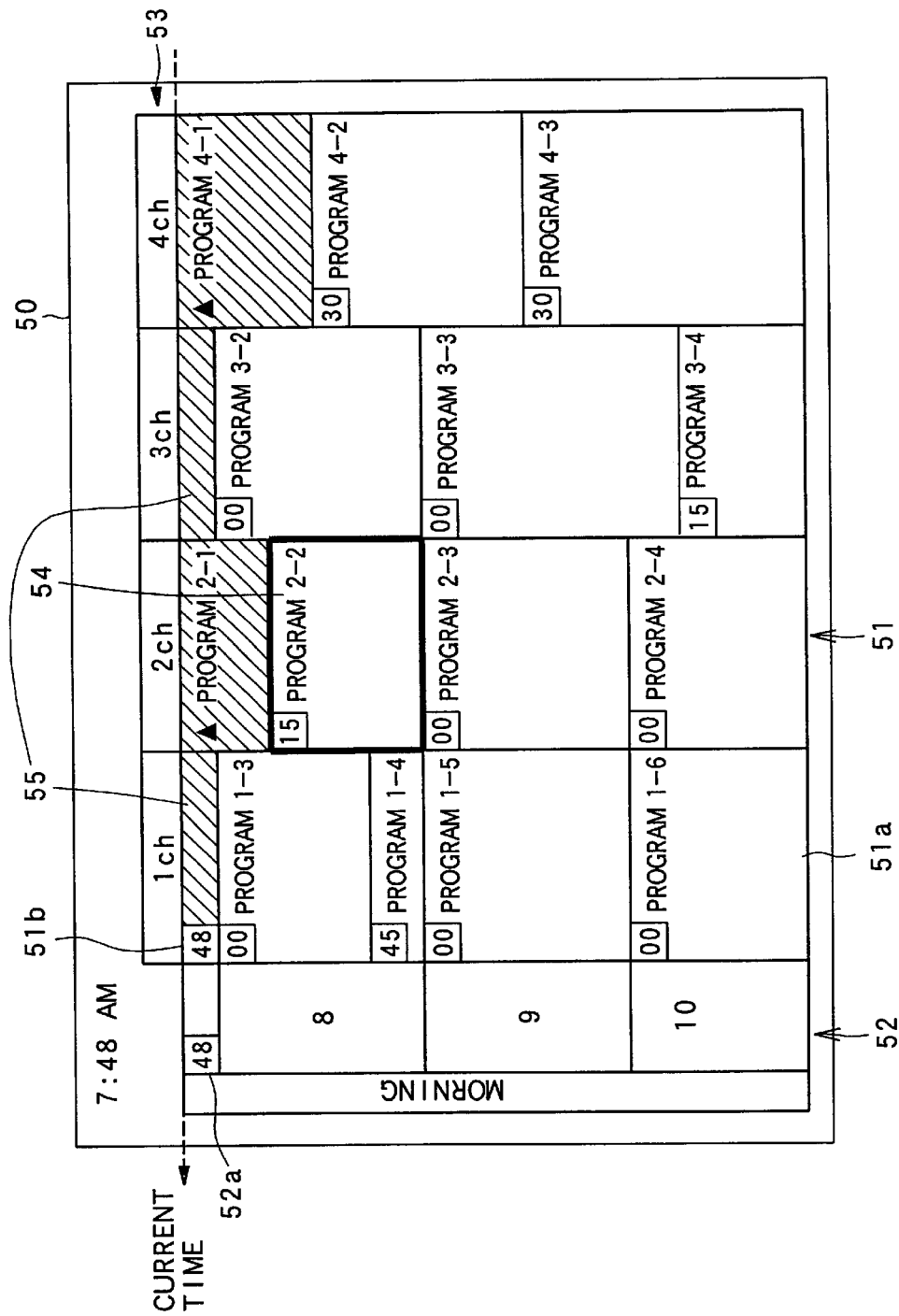
FIG. 8A shows an example of an EPG screen, in the case that the screen displays a program cell 51a, which is insufficient to display program information.

FIG. 8A shows an exemplary EPG screen when program cells 51a, which cannot display program information thereof, are included. As shown in FIG. 8A, program cells 51a for channel 1 (1ch) and channel 3 (3ch) cannot display program information, because the widths along the time axes are too little to display program information in the cells. A CPU 17 will search for such program cells 51a through processing of step S7.

Then, in processing of step S8 the CPU 17 displays a program cell 51a with a changed top display time 52a at the top and adjusts a width along the time axis of a program cell 51a that cannot display the searched program information.

For example, a CPU 17 increases a width along the time axis of a program cell 51a to allow the searched program cell 51a to display program information. FIG. 8B shows an exemplary EPG screen, in which a width along the time axis of a program cell 51a has been adjusted. As shown in FIG. 8B, such adjustment increases widths along the time axis of program cells 51a for programs of channel 1 (1ch) and 3 (3ch) so that program information is displayed within the cells. Also, a width along the time axis of a program cell 51a that can display program information (such as a program cell 51a for a program of channel 2 (2ch) and channel 4 (4ch) shown in FIG. 8A) is increased as shown in FIG. 8B.

In order to increase a width along the time axis of a program cell 51a, if a width along the time axis of a table of programs (height of a table of programs), size of a character, and row spacing are fixed, the last time in a time period display area 52 will be advanced by time period corresponding to the added width. If a displaying width along the time axis on an EPG screen has a remaining space, a table of programs may be arranged to display further program cells for extended time period corresponding to the added width.

A table of programs may also be arranged to display contents of an EPG screen 50 (such as character) compressed in along the time axis without changing the width along the time axis in an EPG screen 50.

If a program cell 51a, whose width along the time axis is insufficient to display program information, is not found in processing of step S7, no width along the time axis of the program cell 51a is adjusted.

According to the first embodiment, as described above, a program cell for a program, whose broadcast has already finished, is not displayed in a table of programs, thereby the program cell for such a program no longer takes up a large part of a limited display area on an EPG screen 50, thereby user's viewability and usability is improved.

Moreover, among a program cell 51a for a program whose broadcast time includes a top display time 52a, if a program cell 52a exists, whose width along the time axis is insufficient to display program information, the program information can be displayed within the cell 51a by adjusting the width along the time axis of the program cell 51a, thereby user's viewability and usability is further improved.

Assume, for example, that the current time is seven o'clock and a time period from one o'clock to three o'clock is displayed for a time period display area 52 by manipulating cursor shift keys 71–74 on a remote controller 12. When the current time passes the earliest end time, a time period on a time period display area 52 is advantageously switched automatically to a time period that includes the current time.

In the EPG screen display processing described in the step S1, if the current time is 7:40 when EPG display data is generated, for example, a top display time is set to a just time earlier than the current time such as 7:00 or 7:30. Alternatively, a top display time may be set to the current time. By setting a top display time as such, program cells for programs whose broadcast have already finished are prevented from being displayed even in a table of programs on an initial EPG screen 50 after an EPG key 61 on a remote controller 12 is pressed.

In the EPG screen display processing described in the step S1 in the same manner as processing of steps S7 and S8, the embodiment may also be adapted to search a program cell 51a, whose width along the time axis is insufficient to display program information, from program cells 51a, whose broadcast time includes a top display time 52a, and to adjust the width thereof.

(Second Embodiment)

FIG. 9 is a flow chart showing displaying processing of an EPG screen by a CPU 17 in a second embodiment. FIG. 10 and FIG. 11 show examples of EPG screens displayed by display processing shown in FIG. 9.

Figure 10A:
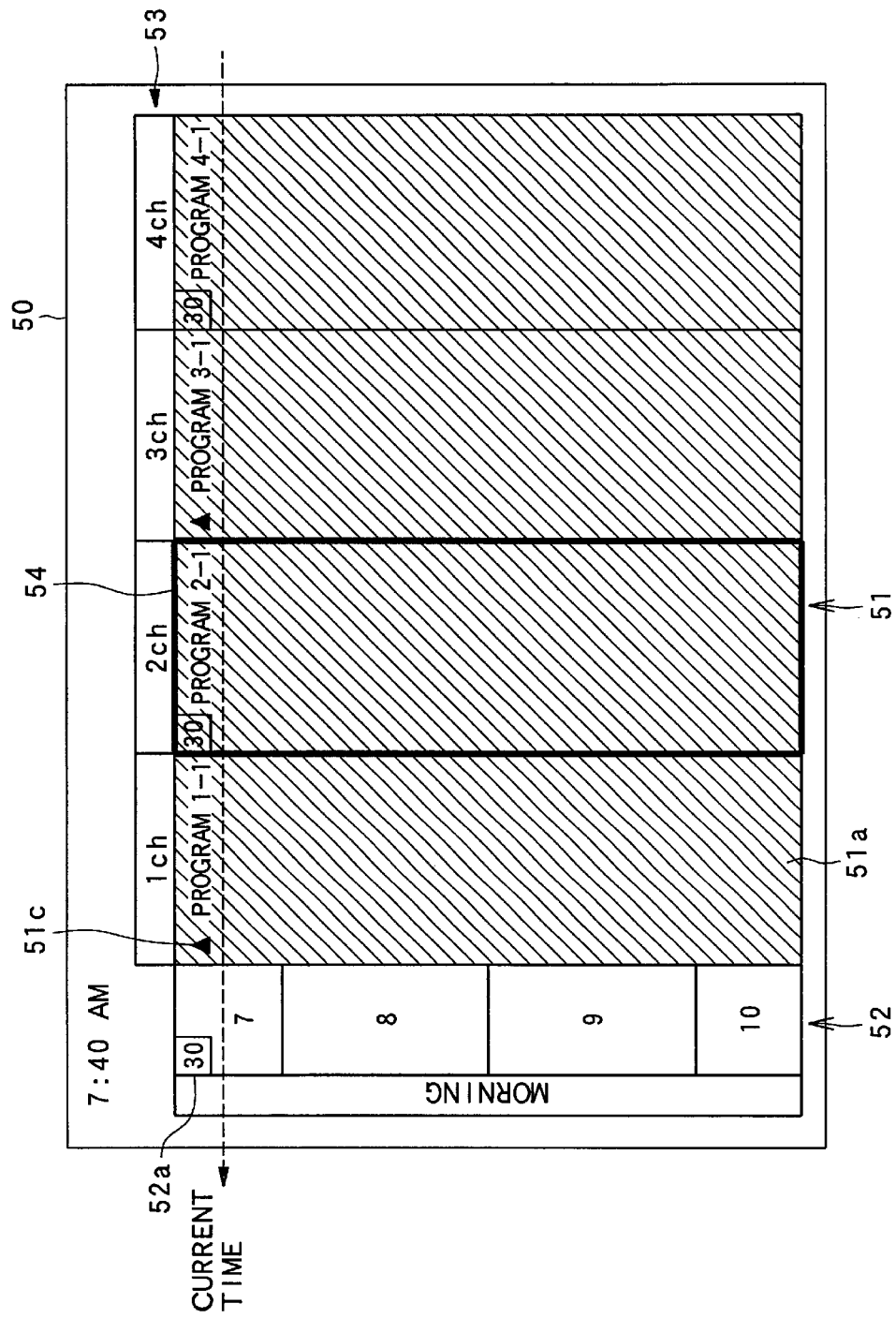
Figure 12:
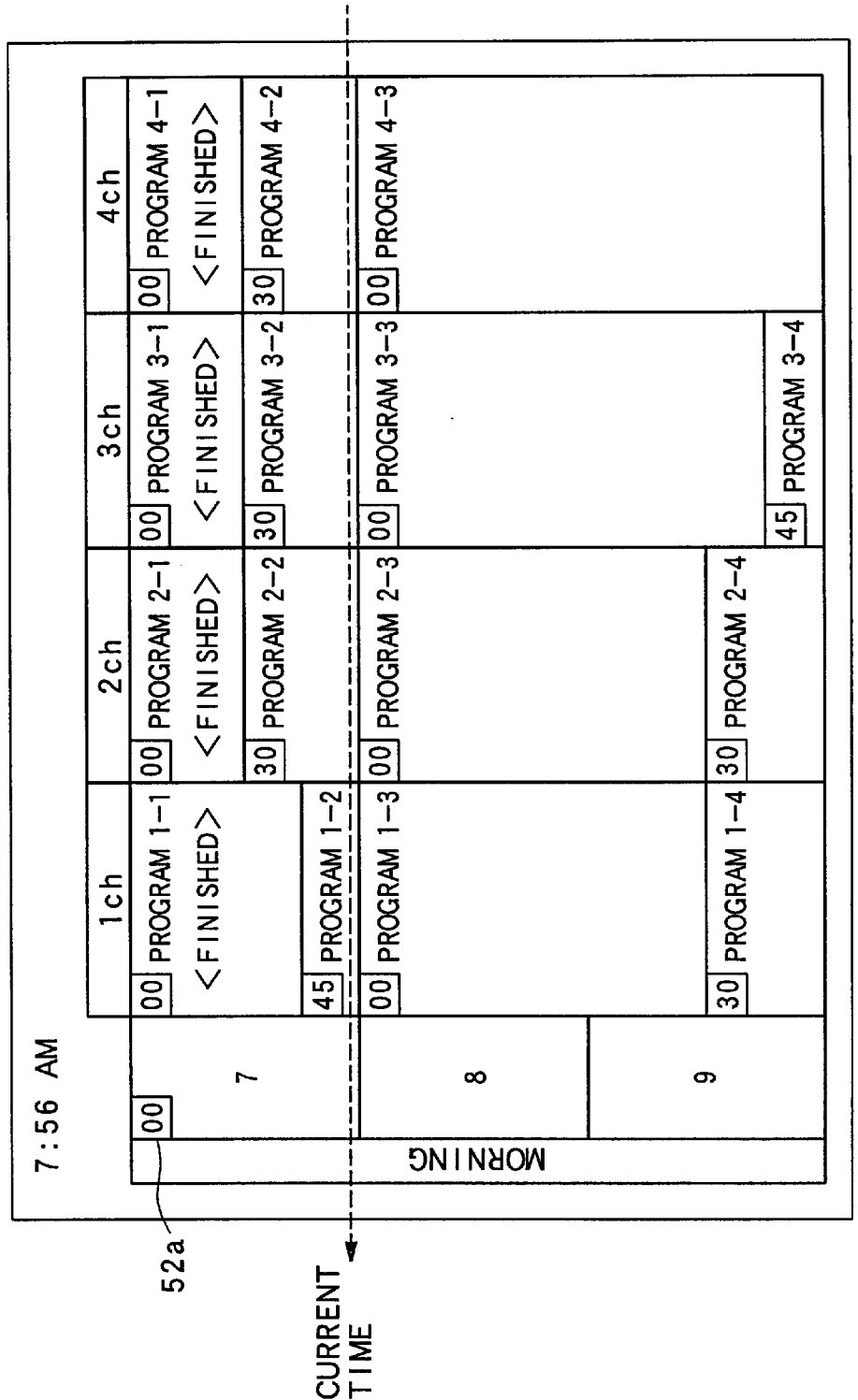
FIG. 12 shows an example of a conventional EPG screen.
Figure 13:
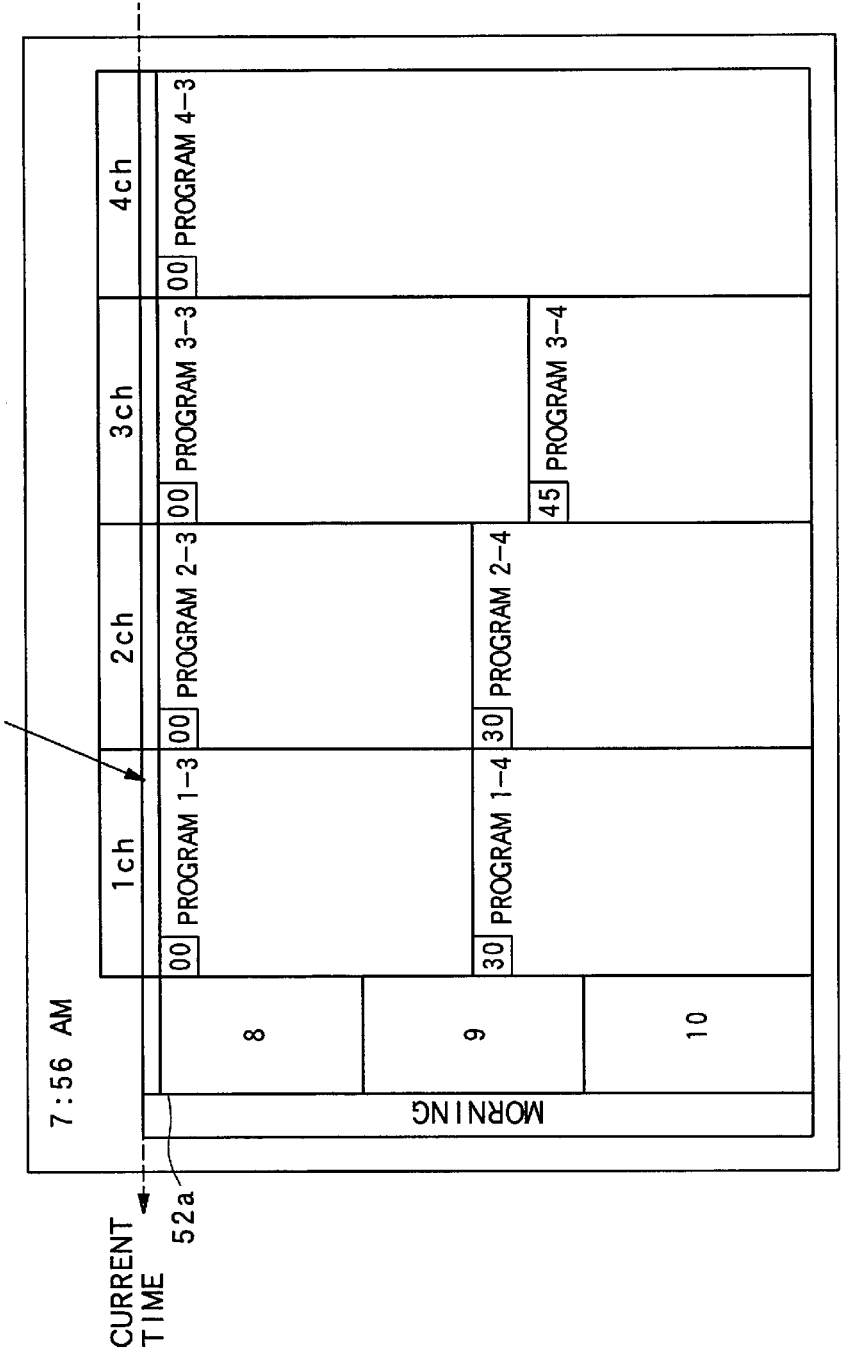
FIG. 13 shows an example of an EPG screen, in the case a unit of display along the time axis is set to one minute.

At first, assuming that an EPG screen 50 shown in FIG. 10A is displayed in an EPG display processing shown in a step S11 (details are same as the first embodiment). In the example of FIG. 10A, every program of channel 1 (1ch)—channel 4 (4ch) is a long time program whose end time occurs after the time period of 7:30–10:29 (it is same for programs of channel 5 (5ch) and after).

Next, a CPU 17 refers to a RAM 16 and searches for programs whose broadcast time includes the current time in the same manner as processing in step S2 shown in FIG. 5 (step S12). However, a program whose end time corresponds to the current time is eliminated from programs to be searched. The programs to be searched are not limited to programs of channels currently displayed on an EPG screen 50 like in the first embodiment.

Then, a CPU 17 refers to a RAM 16 and stores an end time of a program, which finishes earliest of all the searched programs, as a earliest end time in a RAM 16 (step S13) like in processing of a step S3 shown in FIG. 5. Assuming that a program which finishes earliest is, for example, a program of channel 1 (1ch) whose end time is 10:30. In other words, an earliest end time does not appear in the table of programs as shown in FIG. 10A.

A CPU 17 determines whether the current time is the stored earliest end time, or later than the stored earliest end time, like in processing of a step S4 shown in FIG. 5 (step S14). If the current time is not the stored earliest end time, and later than the stored earliest end time (step S14:N), the procedure transfers to processing of a step S15.

It is inconvenient that display processing shown in FIG. 5 cannot display programs after 10:30 until the current time reaches 10:30 in the case shown in FIG. 10A. However, display processing shown in FIG. 9 eliminates such inconvenience by steps S16 and S17.

In other words, the CPU 17 acts as a top display time determination device to determine whether a top display time 52a is earlier than the current time by equal or more than a predetermined time period (for example, two hours) or not. If a top display time 52a is determined not to be earlier than the current time by more than a predetermined time period (step S16:N), the procedure returns to a step S14.

If it is otherwise determined to be earlier than the current time by equal or more than a predetermined time period (step S16:Y), the CPU 17 advances a top display time 52a by the predetermined time period (for example, two hours) and displays a program cell 51a (step S17). This allows a top display time 52a to be appropriately switched even before the current time is determined to be earlier than an earliest end time as shown in FIG. 10B.

If the current time is the stored earliest end time, or later than the stored earliest end time in step S14 (step S14:Y), the CPU 17 changes and sets a top display time 52a to the stored earliest end time (step S18), and searches for a program cell 51a whose width along the time axis is insufficient to display program information from program cells 51a for programs whose broadcast time includes the top display time 52a (step S19). Next, the CPU 17 displays a program cell 51a with the changed top display time 52a as a top display time, and adjusts a width along the time axis of the searched program cell 51a, which is insufficient to display program information (step S20).

In this manner, as shown in FIG. 11, a top display time 52a is displayed as 10:30. Adjustment of a width along the time axis of a program cell 51a is same as that of the first embodiment.

According to the second embodiment, as mentioned above, in addition to the effects of the first embodiment, the effect that a top display time 52a can be appropriately advanced even if a long interval exists between a top display time 52a and an earliest end time further improves user's viewability and usability.

Programs to be searched in processing of steps S1 and S7 shown in FIG. 5 and in processing of steps S12 and S19 shown in FIG. 9 in the first and second embodiments are illustrated as programs of all channels and not limited to the programs of channels currently displayed on an EPG screen 50. Alternatively, programs to be searched may be limited to the programs of channels currently displayed on an EPG screen 50. Programs to be searched may also be limited to the programs of a predetermined range of, for example, 1–20 channels among all of the 100 channels. Processing load of a CPU 17 may be reduced by these arrangements.

Adjustment of a width along the time axis of a program cell 51a performed by a CPU 17 (program cell display device) is arranged to increase a width along the time axis of a program cell 51a in the first and second embodiments, though this does not mean any limitation: For example, adjustment of a width along the time axis of a program cell 51a may include any approach to allow contents of a program to be displayed in a program cell 51a, such as an approach by compressing of characters in a program cell 51a along the time axis or decreasing a point size of a font.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-368375 filed on Dec. 3, 2001 including the specification, claims, drawings and summary is incorporated herein by reference in its entirety.

What is claimed is:

1. A program guide display apparatus for displaying a table of programs, which is a two dimensional arrangement for displaying program cells assigned to respective programs along the time and channel axes, wherein the apparatus searches for a program whose start time is closest to the current time among all the programs whose broadcast time includes the current time, and displays said program cells so that the start time of the searched program becomes a top display time of the table of programs.

2. The program guide display apparatus according to claim 1, wherein all of the programs to be searched include not only the programs that are displayed on the table of programs, but also include the programs that are not displayed on the table of programs.

3. A program guide display apparatus for displaying a table of programs, which is a two dimensional arrangement for displaying program cells assigned to respective programs along the time and channel axes, comprising:

a broadcast program search device which searches for a program whose broadcast time includes the current time;

an earliest end time storage device which stores an end time of a program which finishes earliest of all the searched programs, as an earliest end time;

an earliest end time determination device which determines whether the current time is the stored earliest end time, or later than the stored earliest end time; and a program cell display device which displays a program cell with the stored earliest end time as a top display time of the table of programs, if the current time is the stored earliest end time, or later than the stored earliest end time.

4. The program guide display apparatus according to claim 3, wherein the program cell display device searches for a program cell, whose width along the time axis is insufficient to display program information, from program cells for programs, whose broadcast time includes the top display time, and adjusts the width along the time axis of the searched program cell, when the program cell display device displays the program cell with the earliest end time as the top display time of the table of programs.

5. The program guide display apparatus according to claim 3, further comprising a top display time determination device which determines whether the top display time is earlier than the current time by equal or more than a predetermined time period or not, wherein the program cell display device displays the program cell with the top display time advanced by a predetermined time period, if the top display time is earlier than the current time by equal or more than a predetermined time period.

6. The program guide display apparatus according to claim 3, wherein the program cell display device displays the program cell with the current time as the top display time of the table of programs when the program cell display device displays the first one of the table of programs.

7. The program guide display apparatus according to claim 6, wherein the program cell display device searches for a program cell, whose width along the time axis is insufficient to display program information, from program cells for programs, whose broadcast time include the top display time, and adjusts the width along the time axis of the searched program cell when the program cell is displayed with the current time as the top display time of the table of programs.

8. A program guide display method for displaying a table of programs, which is a two dimensional arrangement for displaying program cells assigned to respective programs along the time and channel axes, comprising:

a process of searching for a program, whose broadcast time includes the current time;

a process of storing an end time of a program that finishes earliest among the searched programs, as an earliest end time;

a process of determining whether the current time is the stored earliest end time, or later than the stored earliest end time; and, a process of displaying the program cell with the earliest end time as a top display time of the table of programs, if the current time is the stored earliest end time, or later than the stored earliest end time.

9. The program guide display method according to claim 8, wherein a program cell, whose width along the time axis is insufficient to display program information, from program cells for programs, whose broadcast time includes the top display time, is searched, and the width along the time axis of the searched program cell is adjusted, when the program cell is displayed with the earliest end time as the top display time of the table of programs.

10. The program guide display method according to claim 8, further comprising a process of determining whether the top display time is earlier than the current time by equal or more than a predetermined time period or not, wherein the program cell is displayed with the top display time advanced by a predetermined time period, if the top display time is earlier than the current time by equal or more than a predetermined time period.

11. The program guide display method according to claim 8, wherein the program cell is displayed with the current time as the top display time of the table of programs, when the first one of the table of programs is displayed.

12. The program guide display method according to claim 11, wherein a program cell, whose width along the time axis is insufficient to display program information, from program cells for programs, whose broadcast time includes the top display time, is searched, and the width along the time axis of the searched program cell is adjusted, when the program cell is displayed with the current time as the top display time of the table of programs.

13. A program guide display apparatus for displaying a table of programs, which is a two dimensional arrangement for displaying program cells assigned to respective programs along the time and channel axes, comprising:

a program search device which searches for a program whose start time is closest to the current time among all the programs whose broadcast time includes the current time;

a program cell display device which displays said program cells so that the start time of the searched program becomes a top display time of the table of programs; and a top display time determination device which determines whether the top display time is earlier than the current time by equal or more than a predetermined time period or not;

wherein the program cell display device displays the program cells with the top display time advanced by a predetermined time period, if the top display time is earlier than the current time by equal or more than a predetermined time period.

* * * * *